United States Patent [19]

Askinasi

[11] Patent Number: 5,136,984
[45] Date of Patent: Aug. 11, 1992

[54] ANIMAL MUZZLE

[75] Inventor: Barry A. Askinasi, Mount Sinai, N.Y.

[73] Assignee: Four Paws Products Ltd., Hauppauge, N.Y.

[21] Appl. No.: 811,255

[22] Filed: Dec. 20, 1991

[51] Int. Cl.⁵ .................................................. A01K 25/00
[52] U.S. Cl. ........................................ 119/130; 119/129
[58] Field of Search ............... 119/129, 130, 131, 132, 119/133, 134, 104

[56] References Cited

U.S. PATENT DOCUMENTS

| | | | |
|---|---|---|---|
| 1,123,018 | 12/1914 | Schubert | 119/104 |
| 1,215,884 | 2/1917 | Smith et al. | 119/133 |
| 1,474,303 | 11/1923 | Veres | 119/130 |
| 3,126,869 | 3/1964 | Young et al. | 119/130 |
| 3,173,401 | 3/1965 | Lupo | 119/133 |
| 4,160,428 | 7/1979 | Wilkinson | 119/133 |
| 4,252,086 | 2/1981 | Schenck | 119/130 |
| 4,603,659 | 8/1986 | Helphrey | 119/130 |

FOREIGN PATENT DOCUMENTS 611129 10/1948 United Kingdom .
2224626 5/1990 United Kingdom ................ 119/130

*Primary Examiner*—John G. Weiss
*Attorney, Agent, or Firm*—Darby & Darby

[57] ABSTRACT

An animal muzzle particularly for cats and dogs undergoing veterinarian treatment, includes a truncated cone mask having, at a snout end thereof, a first smaller opening for encircling the snout of an animal and, at another end, a large opening for encircling the head of the animal at a location remote from the snout of the animal, and two straps attached to the mask for securing the mask on the animal head. A handle strip is attached at its opposite ends to the mask at the mask low jaw supporting portion to facilitate handling of the head of the animal during treatment.

3 Claims, 1 Drawing Sheet

5,136,984

ANIMAL MUZZLE

BACKGROUND OF THE INVENTION

The present invention relates to a new and improved muzzle for domestic animals and, in particular, to a muzzle suitable for use with cats or dogs. More specifically, the present invention relates to a cat or dog muzzle that will facilitate treatment of the animals by a veterinarian by reducing the danger of the veterinarian being bitten by the animal.

Dog and cat muzzles for facilitating treatment of animals by a veterinarian are known. For example, U.S. Pat. No. 4,252,086 discloses an animal muzzle for animals undergoing veterinarian treatment. The muzzle disclosed in U.S. Pat. No. 4,252,086 is formed as a truncated cone mask made of a soft material such as vinyl or leather and is secured on the head of an animal by strap means encircling the animal's head and consisting of two strap portions secured to each other by a buckle. The mask has a small snout opening dimensioned to encircle the mouth and the nose of an animal, while allowing the animal to breathe freely, and a large opposite opening at the end remote from the snout opening. The strap portions are secured at the opposite sides of the mask. The muzzle disclosed in U.S. Pat. No. 4,252,086, while insuring effective restraint of the jaw of the animal and, thus, effectively protecting a veterinarian from being bitten by the animal, does not permit the veterinarian to easily handle the animal's head.

SUMMARY OF THE INVENTION

Accordingly, the main object of the invention is a muzzle that effectively restrains the jaw of an animal treated, i.e., by a veterinarian, while permitting the veterinarian to easily handle the animal's head.

This and other objects of the invention, which will become apparent thereafter, are achieved by providing a muzzle with a handle formed of a strip of an appropriate material and attached to the lower jaw supporting portion of the mask at the opposite ends of the mask.

The muzzle mask according to the present invention is formed as a truncated cone with a vision cut-out in the face portion thereof. The mask is formed, preferably, from a single piece of a soft flexible material such as leather or synthetic material, i.e., nylon. The piece of material in an involute state has a form of two substantially equilateral trapezoids arranged side-by-side with one trapezoid having a length approximately half of the length of the adjacent trapezoid to form the vision cut-out.

The above-mentioned and other features and objects of the invention and the manner of attaining them will become more apparent and the invention itself will be best understood from the following description of the preferred embodiment of the invention when read with reference to the accompanying drawings.

BRIEF DESCRIPTION OF THE INVENTION

DETAILED DESCRIPTION OF THE PREFERRED EMBODIMENT

Figure 1:
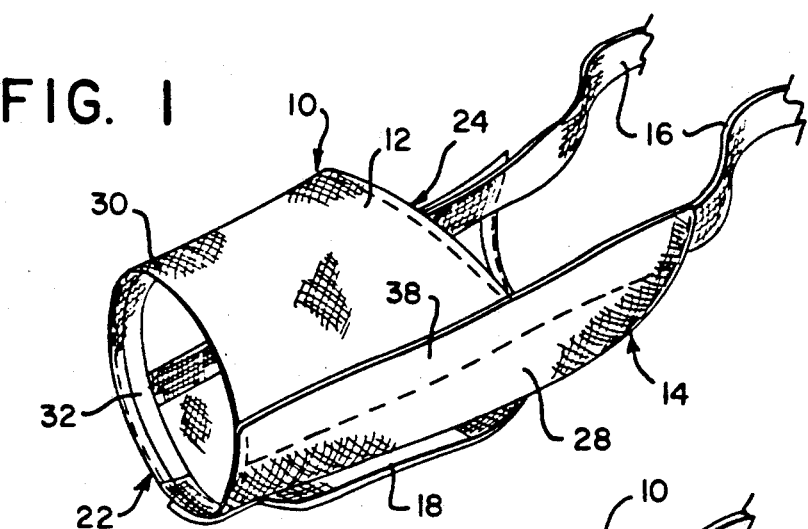
FIG. 1 shows a perspective view of an animal muzzle according to the present invention.
Figure 2:
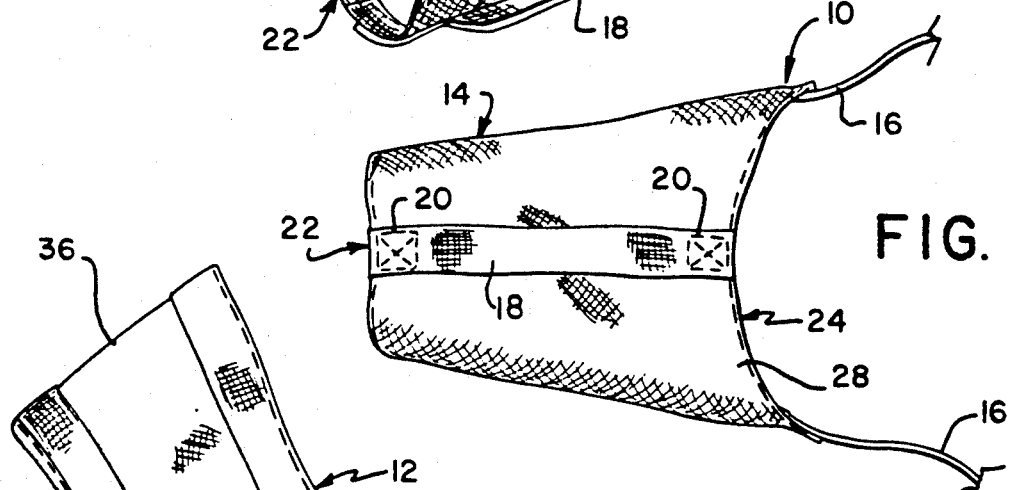
FIG. 2 shows a bottom view of the animal muzzle shown in FIG. 1.

FIG. 1 shows a perspective view of an animal muzzle 10 according to the present invention. The muzzle 10 is formed as a truncated cone mask having an upper face portion 12 and a lower jaw supporting portion 14. Two straps 16 are attached at opposite lateral sides of the muzzle 10 for securing the muzzle on the head of an animal. The straps 10 are connectable with each other with a buckle (not shown). A handle 18 is secured to the bottom surface of the lower jaw supporting portion 14. The handle 18 is attached to the jaw supporting portion 14 approximately along the axis of the jaw supporting portion by appropriate stitching 20 at the snout and opposite ends of the muzzle 10. The upper face portion 12 and the lower jaw supporting portion 14 form a smaller opening 22 at the snout end of the muzzle 10 for encircling the snout of an animal and a larger opening 24 for encircling the head of the animal. As can be seen in FIG. 1, the upper face portion 12 is made shorter than the lower jaw supporting portion 14 to form a vision cut-out.

Figure 3:
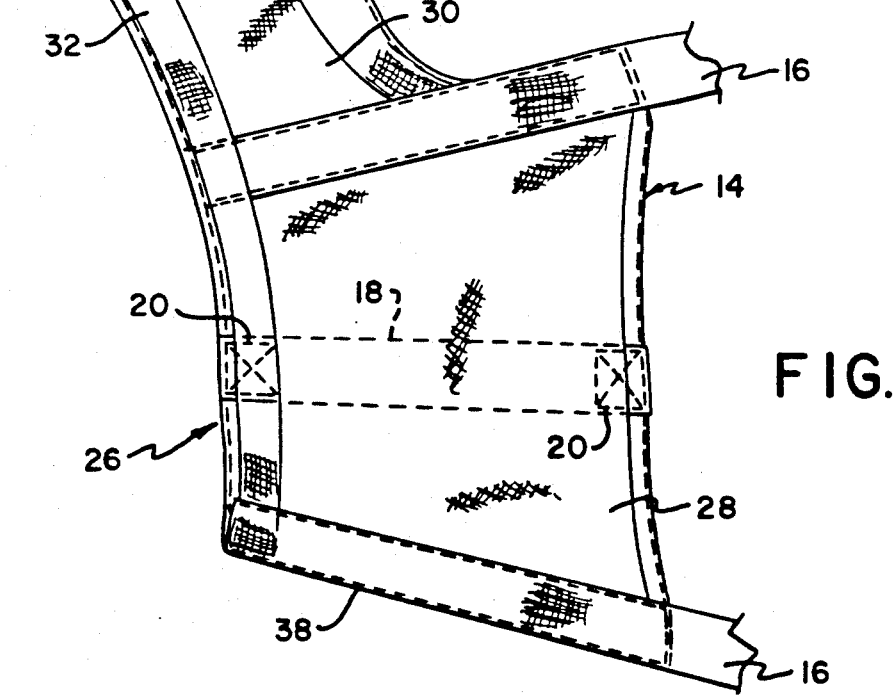
FIG. 3 shows a developed view of a blank from which the animal muzzle of FIG. 1 is made.

FIG. 3 shows a planar blank piece of material 26 from which the muzzle 10 is made. The material used should be a soft flexible material, i.e., vinyl, leather or nylon, so that the muzzle conforms to the contours of the animal face. The blank piece 26 has a first substantially equilateral trapezoidal portion 28 and a second also substantially equilateral trapezoidal portion 30. The second portion 30 is made shorter than the first portion 28 so that the vision cutout is formed when the free side 36 of the second portion 30 is attached to the free side 38 of the first portion 28 to form a muzzle. The blank piece 26 preferably has two reinforcing strips 32 and 34 attached thereto. The longer strip 3 is attached to coinciding snout edges of the first and second portions 28 and 30 of the planar blank piece 26, and the shorter strip 34 is attached to the edge of the second portion 30 which is opposite to the snout edge thereof.

The muzzle 10 is formed as follows. After the blank piece 26 is cut out, a shorter strip 34 is attached to a longitudinal head edge of the second portion 30 of the blank piece 26, preferably by stitching. Thereafter, the two straps 16 are attached, again preferably by stitching, at two lateral edges of the first portion 28 of the blank piece 26. Finally, a longer reinforcing strip 32 is attached, by stitching, at the coinciding snout edges of the first and second portions 28 and 30 of the blank piece 26. After that, the handle 18 is attached, at its opposite ends, to the bottom surface of the first portion 30 approximately in the middle thereof at the snout and other opposite end of the blank piece 26. The handle may be attached by stitching, rivets, and other appropriate means.

While the invention has been described herein in terms of the preferred embodiment, numerous modifications thereof will be apparent to those skilled in the art and, therefore, it is not intended that the invention be limited to the disclosed embodiment or details thereof, and the departures may be made therefrom within the spirit and scope of the invention as defined in the appended claims.

What is claimed is:

1. An animal muzzle particularly for cats or dogs undergoing veterinarian treatment, said muzzle comprising a truncated cone mask having, at a snout end thereof, a first smaller opening for encircling the snout of an animal and, at a remote end thereof opposite to said snout end, a large opening for encircling the head of the animal at a location remote from the snout of the animal; strap means for securing the mask on the animal head; and a handle strip attached to said mask to facilitate handling of the head of the animal during treatment; said truncated cone mask having an upper face portion and a lower jaw supporting portion, said handle strip being secured to said lower jaw supporting portion at said snout and remote ends;

said truncated cone mask being formed of an integral piece of relatively soft flexible material and including a first portion having a shape of a substantially equilateral trapezoid having a first length and defining said lower jaw supporting portion of said mask, and a second portion also having a shape of a substantially equilateral trapezoid having a second length which is approximately half of said first length, and defining said upper face portion.

2. An animal muzzle particularly for cats or dogs undergoing veterinarian treatment, said muzzle comprising a truncated cone mask having, at a snout end thereof, a first smaller opening for encircling the snout of an animal and, at a remote end thereof opposite to said snout end, a large opening for encircling the head of the animal at a location remote from the snout of the animal; strap means for securing the mask on the animal head; a handle strip attached to said mask to facilitate handling of the head of the animal during treatment, said truncated cone mask having an upper face portion and a lower jaw supporting portion, said handle strip being secured to said lower jaw supporting portion at said snout and remote ends; and reinforcing first and second annular strips secured inside said mask at edges of said snout and remote ends of said mask, respectively.

3. An animal muzzle as set forth in claim 2 wherein said strap means and said reinforcing first and second strips are attached to said mask by stitching.

* * * * *